May 15, 1928.  
G. R. PLOVICH  
RHEOSTAT  
Filed April 12, 1923
1,670,004
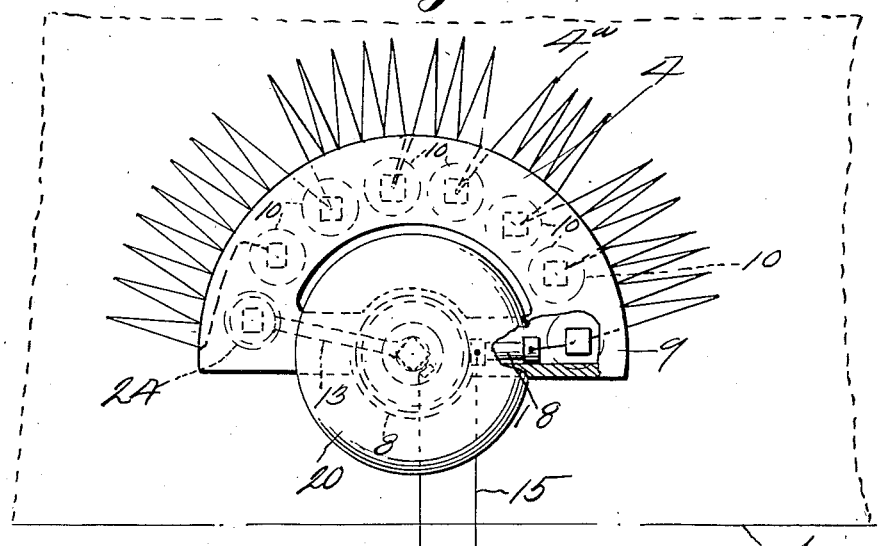
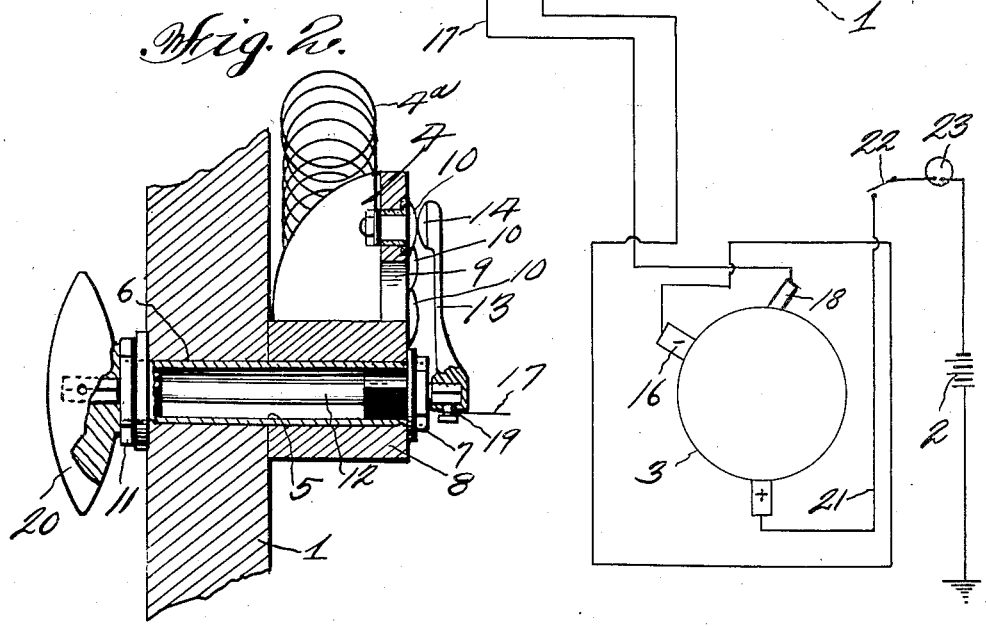
Inventor  
G. R. Plovich  
By  
Attorney Patented May 15, 1928.

1,670,004

UNITED STATES PATENT OFFICE.

GEORGE RUDOLPH PLOVICH, OF BENLD, ILLINOIS.

RHEOSTAT.

Application filed April 12, 1923. Serial No. 631,647.

The invention relates to charging circuit regulators for automobiles, and has for its object to provide a device of this character which is mounted on the dash board of the automobile within easy reach of the operator, thereby allowing the operator to regulate the charging circuit from a generator according to conditions under which the automobile is being used. It has been found that where no regulating means is provided that the battery is damaged, for instance where a long trip is being taken in the automobile, the generator generates more than sufficient power to charge the battery, which power will damage the generator or allow the same to heat and will also damage the battery. To overcome this difficulty, operators at the present time have to have generator adjustments made from time to time during the trip, or try to overcome the difficulty by burning the lights, which is unsatisfactory and does not entirely overcome the difficulty.

A further object is to provide a rheostat carried by the dash board, which rheostat is in circuit with the commutator, and the field of the generator, thereby allowing the current to be controlled. Also to provide in connection with the circuit a fuse with an amperage, which will fuse at a predetermined power and consequently prevent burning out of the parts.

A further object is to provide a rheostat for a dash board of an automobile, which rheostat may be easily and quickly applied to the dash board and comprising a tubular member extending through an aperture in the dash, a shaft rotatably mounted in the tubular member and to which a contact arm is connected at one end and a knob at the other end. The rheostat carrying member is detachably connected on the outer end of the sleeve and rigidly held by a nut carried by the sleeve in a position whereby the arm may be moved into engagement with contact members of the rheostat.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a rear elevation of the device, showing a portion of a conventional form of dash in dotted lines.

Figure 2 is a transverse sectional view through a portion of a dash of an automobile and the rheostat.

Referring to the drawing, the numeral 1 designates a dash board of a conventional form of automobile, 2 a storage battery and 3 a generator, which generator is operated in the usual manner for generating electric energy for the storage battery 2.

It has been found, particularly on long trips that the generator 3 will generate too much electric energy for the storage battery 2, thereby damaging the battery, as well as damaging the generator. To obviate this difficulty, the dash board 1 is provided with a rheostat 4, which rheostat may be easily and quickly applied to the dash. The rheostat 4 comprises a sleeve 5, which extends through an aperture 6 in the dash, and has secured to its forward end by means of a nut 7, the hub 8 of a disc 9, which disc is provided with a plurality of arcuately arranged contacts 10. Threaded on the rear end of the sleeve 5 is a lock nut 11, which nut, in combination with the nut 7 securely clamps the sleeve 5 in place, and at the same time the plate 9, thereby preventing displacement of the plate. Extending axially through the sleeve 5 is a shaft 12, the forward end of which is provided with a conductor arm 13, which arm is adapted to be moved and rotated by the shaft 12 for positioning the contact 14 carried by the arm in engagement with any of the contacts 10 for varying the resistance of the resistance coil 14, which coil is in circuit with the contacts 10, and also with the generator 3 through the wire 15, which leads to the fields 16 of the generator and the wire 17, which leads to the brush 18 of the generator. Wire 15 has connected thereto a fuse 18, which is adapted to fuse at a predetermined amperage for the particular type of generator being used and a 15 ampere fuse has been found to be sufficient. The conductor wire 17, which is connected to the brush 18 is connected by means of a binding post 19 to the arm 13, therefore it will be seen that when the knob 20 carried by the rear end of the shaft 12 is rotated that the number of convolutions of the rheostat 4ª left within the circuit may be varied for reducing or increasing the amount of power generated by the generator 3 and allowed to pass to the storage battery 2 through the conductor wire 21. The wire 21 is connected to a switch 22, by means of which the circuit may be broken to the battery 2 and with an ammeter 23, by means of which the amount of power stored may be ascertained.

However to further prevent damage to the generator and battery, the operator of the automobile may move the arm 13 to the position shown in Figure 1, where it will engage a dead button 24, thereby breaking the circuit when the storage of energy is not desired. It will be seen that the operator may regulate the device according to conditions of driving and by turning the knob to the left, in reference to Figure 1, an increasing number of convolutions of the rheostat 4ª are cut into the circuit by turning to the right a smaller amount of convolutions are cut into the circuit.

The more resistance that is cut out the stronger the field magnets 15 will be, which will cause the generator 2 to charge more amperes. By cutting in resistance the generator field 16 will cause less current to be produced by the generator.

From the above it will be seen that a dash board rheostat is provided which is simple in construction, disposed within easy reach of the operator of an automobile, and one which may be easily and quickly applied to the dash board of an automobile, without special skill and without materially varying the construction of the dash board.

The invention having been set forth what is new and useful is:—

A rheostat comprising a cylindrical sleeve extending through a support, insulating supports in the ends of said sleeve, a shaft rotatably mounted in bearings of said insulating supports, a handle member carried by one end of said shaft, a rheostat coil adjacent one end of the shaft and having convolutions connected to contact members, and an arm carried by one end of the shaft and positioned to cooperate with said contact members.

In testimony whereof I have signed my name to this specification.

GEORGE RUDOLPH PLOVICH.